United States Patent
Hoover et al.

(10) Patent No.: US 12,269,600 B2
(45) Date of Patent: Apr. 8, 2025

(54) BREAKOVER VEHICLE OPERATOR SEAT CONVERTIBLE TO NON-BREAKOVER CONFIGURATION

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/226,364

(22) Filed: Jul. 26, 2023

(65) Prior Publication Data

US 2025/0033778 A1    Jan. 30, 2025

(51) Int. Cl.
*B64D 11/06*    (2006.01)

(52) U.S. Cl.
CPC ........ *B64D 11/0696* (2013.01); *B64D 11/064* (2014.12)

(58) Field of Classification Search
CPC .............. B64D 11/0696; B64D 11/064; B64D 11/0641; B64D 25/04
See application file for complete search history.

(56) References Cited

U.S. PATENT DOCUMENTS

| | | | |
|---|---|---|---|
| 4,625,934 A * | 12/1986 | Ryan | B64D 11/06 297/344.17 |
| 4,925,229 A | 5/1990 | Siebler | |
| 6,478,256 B1 | 11/2002 | Williamson | |
| 10,391,915 B2 | 8/2019 | Last | |
| 10,414,501 B2 | 9/2019 | Thompson et al. | |
| 10,464,679 B2 | 11/2019 | Hoover et al. | |
| 10,518,667 B2 | 12/2019 | Abe et al. | |
| 10,894,489 B2 | 1/2021 | Whitaker | |
| 11,059,587 B2 | 7/2021 | Finlay et al. | |

(Continued)

FOREIGN PATENT DOCUMENTS

| | | |
|---|---|---|
| CA | 2017856 A1 | 12/1990 |
| WO | 2020166294 A1 | 8/2020 |

OTHER PUBLICATIONS

European Search Report received in EP Application No. 24190616.3, Jan. 7, 2025, 10 pages.

*Primary Examiner* — Rodney A Bonnette
(74) *Attorney, Agent, or Firm* — Suiter Swantz IP (57) ABSTRACT

A seat frame structure for a rotorcraft or other vehicle operator seat is convertible between non-breakover and breakover configurations. The structure includes fixed frame members mounted to the cabin floor (e.g., via floor tracks) and pivoting frame members for supporting the operator seat, the pivoting and fixed frame members connected by a bushing assembly. The seat frame structure includes a tilt controller with coupling pins extending into the fixed frame members, locking the structure into the non-breakover configuration. A control lever mounted to the seat frame structure controls the coupling pins via connecting cables; the occupant of the seat may, via the control lever, transition the seat frame structure to the breakover configuration by retracting the coupling pins into the pivoting frame members, enabling rearward rotation of the pivoting frame members (e.g., at least 80 degrees, or contact with the cabin floor).

12 Claims, 11 Drawing Sheets

(56) References Cited

U.S. PATENT DOCUMENTS

| | | |
|---|---|---|
| 11,577,839 B2 | 2/2023 | Hoover |
| 2013/0049416 A1* | 2/2013 | Funke .................... B60N 2/23 |
| | | 297/216.13 |
| 2018/0057169 A1 | 3/2018 | Phi |
| 2018/0290751 A1* | 10/2018 | Emrich ............. B64D 11/0696 |
| 2018/0312258 A1 | 11/2018 | Itzinger et al. |
| 2020/0031475 A1* | 1/2020 | Gross ................ B64D 11/0696 |
| 2023/0144561 A1* | 5/2023 | Pacheco ................ B64D 25/04 |
| | | 244/118.6 |
| 2023/0166644 A1 | 6/2023 | Yun et al. |

\* cited by examiner

BREAKOVER VEHICLE OPERATOR SEAT CONVERTIBLE TO NON-BREAKOVER CONFIGURATION

BACKGROUND

Helicopters or other rotorcraft generally have a side door allowing entry to and exit from the cockpit or control area. In the event these side doors are sufficiently damaged, removal of an injured or disabled pilot therethrough may be precluded. Accordingly, it may be necessary to remove the pilot toward the rear of the cockpit.

SUMMARY

In a first aspect, a convertible seat frame structure for a pilot seat (e.g., co-pilot seat, operator seat) for a rotorcraft or like aircraft or vehicle is disclosed. In embodiments, the seat frame structure includes fixed frame members mounted to the cabin floor (e.g., via floor tracks) and pivoting frame members for supporting the vehicle seat (e.g., seatback and seatpan), the pivoting and fixed frame members connected by a bushing assembly. The seat frame structure has a default configuration wherein the pivoting frame members and fixed frame members are in a fixed relationship and a breakover configuration wherein the pivoting frame members are rotatable in a rearward direction, e.g., through at least an 80-degree angle to a position where the pivoting frame members contact the cabin floor, relative to the bushing assembly. The seat frame structure includes a tilt controller comprising coupling pins extending through the pivoting frame members and into the fixed frame members, locking the structure into the default configuration. A control lever mounted to the seat frame structure controls the coupling pins via connecting cables; for example, the occupant of the seat may, via the control lever, transition the seat frame structure from the default to the breakover configuration by retracting the coupling pins into the pivoting frame members, allowing the pivoting frame members to freely pivot or rotate rearward.

In some embodiments, the control lever is secured in a locked position (e.g., corresponding to the default configuration of the seat frame structure) by a locking pin which must be removed from the path of the control lever in order for the control lever to be articulated.

In some embodiments, the occupant may return the seat frame structure from the breakover configuration to the default configuration by returning the control lever from an engaged position to the locked position.

In some embodiments, the coupling pins are set into housings, and the seat frame structure includes ledgers or stabilizing shelves mounted to the fixed frame members below the coupling pin housings. The ledgers prevent damage to the coupling pins and housings by transferring forward rotational loads (e.g., associated with an impact event) from the pivoting frame members to the fixed frame members.

In some embodiments, the coupling pin is set into a coupling pin housing and spring-loaded, the compression springs controllable via the control lever and cables to regulate the extension or retraction of the coupling pin relative to the fixed frame members.

In some embodiments, the coupling pin assembly may be replaced with a fixed coupling pin assembly to lock the seat frame structure into the default, fixed configuration. For example, the coupling pin assembly (and optionally the cables and control lever) can be removed from the coupling interface and replaced with a fixed coupling pin connected to a flanged mounting component and mounting screws or fasteners fixing the mounting component to the fixed frame member. With respect to both the retractable and the fixed coupling pin assemblies, the coupling pin, mounting component, and mounting fasteners are identical in size, shape, and material composition.

In a further aspect, an operator seat assembly for a rotorcraft or like aircraft or vehicle capable of conversion between breakover and non-breakover configurations is also disclosed. In embodiments, the seating assembly includes an operator seat (e.g., pilot seat, co-pilot seat) accommodating an operator of the vehicle. The seat assembly includes a seat frame structure via which the operator seat is mounted to the cabin floor, the seat frame structure including fixed frame members mounted to the cabin floor (e.g., via floor tracks) and pivoting frame members to which the operator seat is attached, the pivoting and fixed frame members connected by a bushing assembly. The seat frame structure has a default configuration wherein the pivoting frame members and fixed frame members are in a fixed relationship and a breakover configuration wherein the pivoting frame members are rotatable in a rearward direction, e.g., through at least an 80-degree angle to a position where the pivoting frame members contact the cabin floor, relative to the bushing assembly. The seat frame structure includes a tilt controller comprising coupling pins extending through the pivoting frame members and into the fixed frame members, locking the structure into the default configuration. A control lever mounted to the seat frame structure controls the coupling pins via connecting cables; for example, the occupant of the seat may, via the control lever, transition the seat frame structure from the default to the breakover configuration by retracting the coupling pins into the pivoting frame members, allowing the pivoting frame members to freely pivot or rotate rearward.

In some embodiments, the control lever is secured in a locked position (e.g., corresponding to the default configuration of the seat frame structure) by a locking pin which must be removed from the path of the control lever in order for the control lever to be articulated.

In some embodiments, the occupant may return the seat frame structure from the breakover configuration to the default configuration by returning the control lever from an engaged position to the locked position.

In some embodiments, the coupling pins are set into housings, and the seat frame structure includes ledgers or stabilizing shelves mounted to the fixed frame members below the coupling pin housings. The ledgers prevent damage to the coupling pins and housings by transferring forward rotational loads (e.g., associated with an impact event) from the pivoting frame members to the fixed frame members.

In some embodiments, the coupling pin is set into a coupling pin housing and spring-loaded, the compression springs controllable via the control lever and cables to regulate the extension or retraction of the coupling pin relative to the fixed frame members.

In some embodiments, the coupling pin assembly may be replaced with a fixed coupling pin assembly to lock the seat frame structure into the default, fixed configuration. For example, the coupling pin assembly (and optionally the cables and control lever) can be removed from the coupling interface and replaced with a fixed coupling pin connected to a flanged mounting component and mounting screws or fasteners fixing the mounting component to the fixed frame member. With respect to both the retractable and the fixed coupling pin assemblies, the coupling pin, mounting component, and mounting fasteners are identical in size, shape, and material composition.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a pilot or operator seat for a rotorcraft, helicopter, or like vehicle convertible between breakover and non-breakover capability as needed. For example, a single seat frame structure can be adapted for actuated breakover capability or locking out breakover capability if it is not needed. The seat frame structure may be actuated to rotate backwards via coupling pins accessible via a seat-mounted control.

Figure 1:
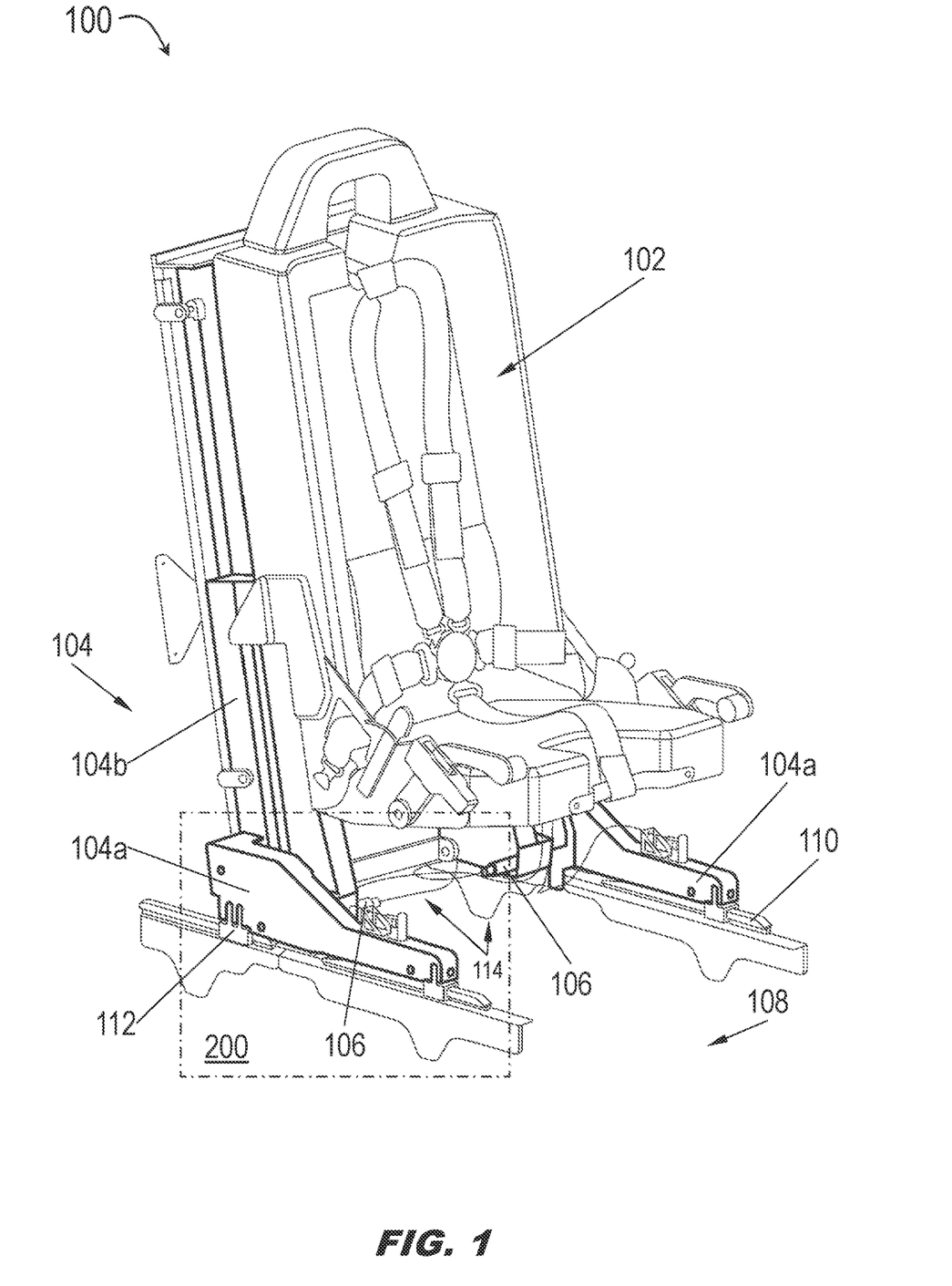
FIG. 1 is an isometric view of a vehicle operator seat secured to a cabin floor via a convertible seat frame structure providing breakover capability according to example embodiments of this disclosure.

Referring to FIG. 1, a vehicle seating assembly 100 is shown. The vehicle seating assembly 100 may include an operator seat 102, a seat frame structure 104 including fixed frame members 104a and pivoting frame members 104b, and coupling pin assembly 106.

In embodiments, the operator seat 102 may accommodate a pilot, co-pilot, or other operator of a rotorcraft or other like vehicle (e.g., helicopters, other aircraft). For example, the operator seat 102 may be supported by, and mounted to a cabin floor 108 of the rotorcraft by, the seat frame structure 104. In embodiments, left-side and right-side fixed frame members 104a may be mounted to floor tracks 110 set into the cabin floor 108. For example, the fixed frame members 104a may be secured to the floor tracks 110 via floor track grippers 112 and via a double-shear locking pin system as disclosed by concurrently filed U.S. patent application Ser. No. 18/226,325, which application is herein incorporated by reference in its entirety.

In embodiments, the operator seat 102 may be mounted to the pivoting frame members 104b, which in turn may provide energy absorption and/or attenuation in response to an impact event (e.g., vertical stroking distance). Further, the pivoting frame members 104b may be configured for breakover relative to the fixed frame members 104a. For example, as disclosed in greater detail below, the pivoting frame members 104b may be rotated rearward relative to the fixed frame members 104a, e.g., for removal of an injured or disabled pilot or operator if the side door exits from the cockpit are damaged or obstructed.

In embodiments, the vehicle seating assembly 100 may have a default configuration wherein the coupling pin assembly 106 may secure the pivoting frame members 104b relative to the fixed frame members 104a, e.g., at a fixed angle conducive to normal operation of the rotorcraft by an occupant of the operator seat 102. For example, the vehicle seating assembly 100 may remain in the default configuration unless and until the coupling pin assembly 106 is engaged to enable breakover capability. In embodiments, when the vehicle seating assembly is in the engaged configuration, the pivoting frame members 104b may be rotated or pivoted relative to the fixed frame members 104a as shown below. For example, the operator (or other personnel) may engage breakover capability by actuating a control lever (not shown) connected to the coupling pin assembly 106 (e.g., via actuator cables 114).

Figure 2:
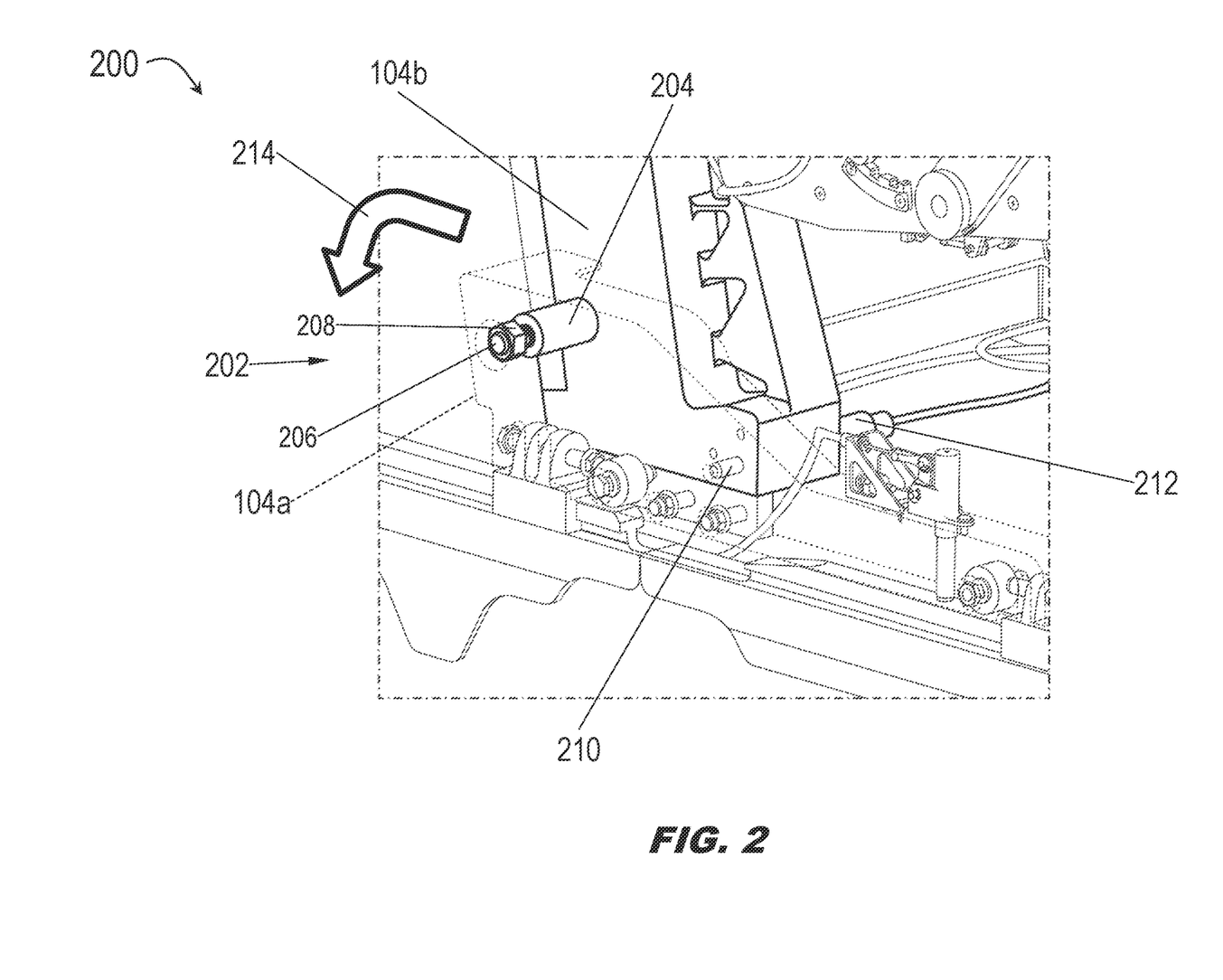
FIG. 2 is a detailed view of the convertible seat frame structure of FIG. 1.

Referring also to FIG. 2, a detailed view 200 of the seat frame structure (104, FIG. 1) is shown, in particular the fixed frame members 104a and pivoting frame members 104b.

In embodiments, the pivoting frame members 104b may be attached to the fixed frame members 104a via a bushing assembly 202 (including bushing 204, bolt 206 and nut 208) and the coupling pin 210 set into a coupling pin housing 212 (the coupling pin and coupling pin housing together comprising the coupling pin assembly (106, FIG. 1)). For example, the coupling pin 210 may project through the pivoting frame member 104b (e.g., through a hole or like recess set thereinto) into a similar hole or recess within the fixed frame member 104a, securing the pivoting and fixed frame members at a fixed angle. In embodiments, the bushing assembly 202 may define a substantially lateral rotational axis (e.g., assuming a substantially forward-facing or rear-facing operator seat 102) such that when the coupling pin 210 is engaged to enable breakover capability (e.g., and the coupling pin retracts from the fixed frame member 104a into the pivoting frame member 104b), the pivoting frame member may rotate 214 relative to the rotational axis.

Figure 3A:
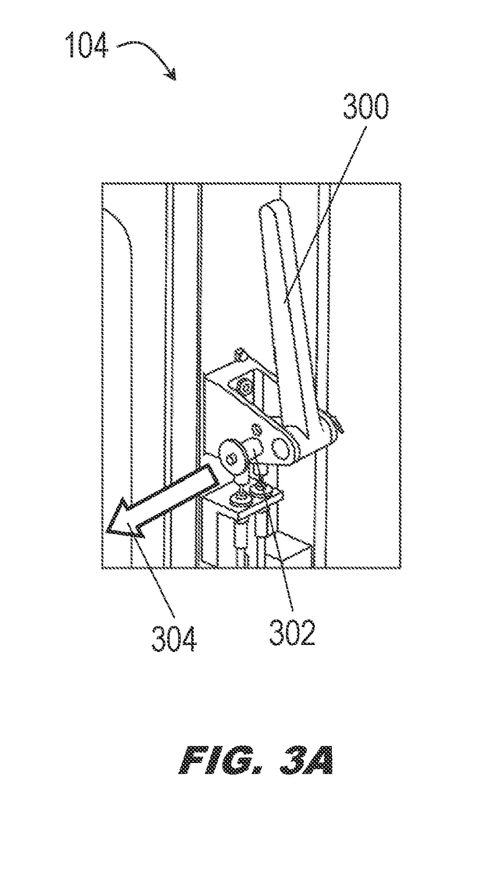
FIGS. 3A through 3C are detailed views of a control lever for the convertible seat frame structure of FIG. 1.

Referring now to FIG. 3A, a control lever 300 for the convertible seat frame structure 104 is shown.

In embodiments, the control lever 300 may be secured in a locked configuration by a safety locking pin 302 preventing engagement of the control lever without first disengaging 304 the locking pin from the path of the control lever.

Figure 3B:
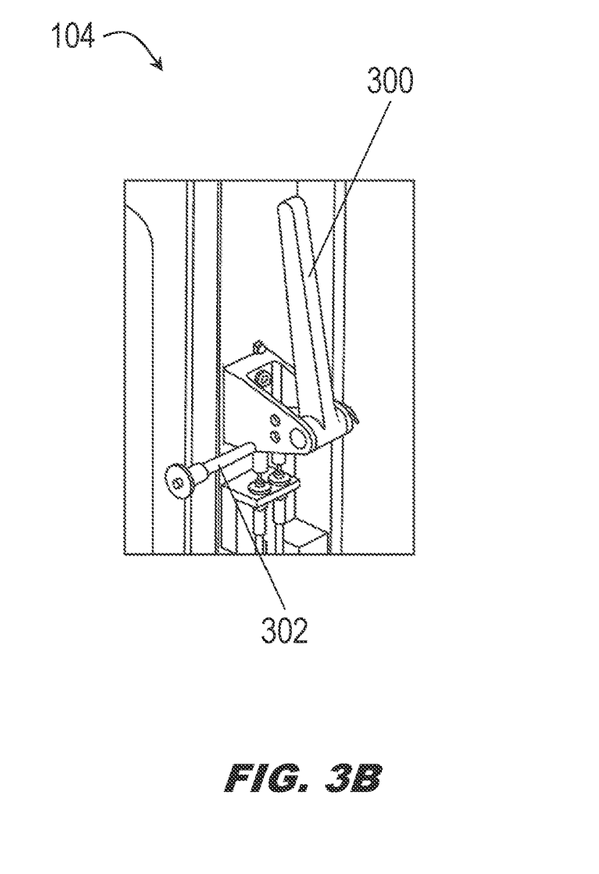

Referring also to FIG. 3B, in embodiments the locking pin 302 may be removed (304, FIG. 3A) from the path of the control lever 300, thus unlocking the control lever and enabling engagement of breakover capability thereby. However, as shown by FIG. 3B, the control lever 300 may remain in a disengaged position.

Figure 3C:
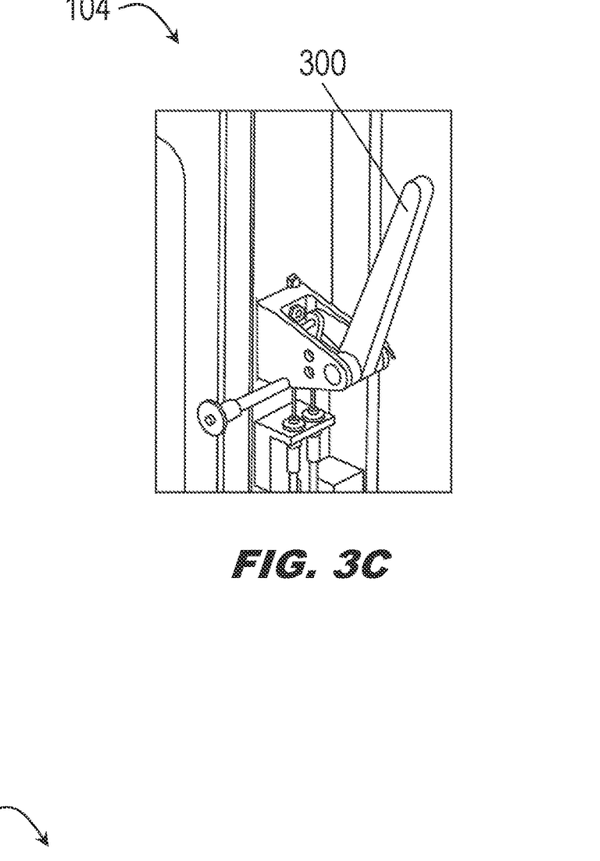

Referring also to FIG. 3C, in embodiments the control lever 300 may be engaged once the locking pin 302 is removed (304, FIG. 3A) from its path. For example, the control lever may be rotated (e.g., around 30 degrees from the locked position shown by FIGS. 3A and 3B), engaging the actuator cables (114, FIG. 1) and retracting the coupling pin (210, FIG. 2) from the fixed frame members (104a, FIG. 2).

Figure 3D:
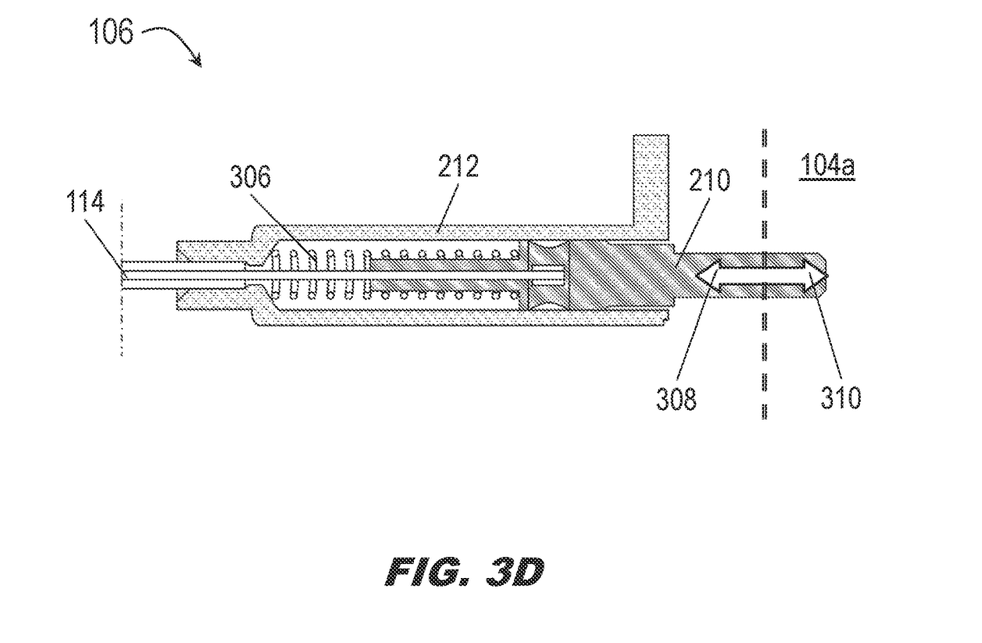
FIG. 3D is a cross sectional view of the coupling pin assembly for the convertible seat frame structure of FIG. 1.

Referring also to FIG. 3D, the coupling pin assembly 106 is shown.

In embodiments, the coupling pin assembly 106 may operate similarly to the locking pin disclosed in concurrently filed U.S. patent application Ser. No. 18/226,325, which application is herein incorporated by reference in its entirety.

For example, the coupling pin assembly 106 may comprise a coupling pin 210 spring-loaded into a coupling pin housing 212 via compression springs 306, the coupling pin 210 connected to the control lever 300 via cables 114.

In embodiments, when the control lever is 300 rotated to the engaged position shown by FIG. 3C, the cables 114 compress the compression springs 306 and retract (308) the coupling pin 210 from its recess within the fixed frame member (104, FIG. 1) and into the coupling pin housing 212. Similarly, when the control lever 300 is released from the engaged position of FIG. 3C and allowed to return to the locked position shown by FIG. 3B, the compression energy of the compression springs 306 is released, also releasing (310) the coupling pin 210 from the coupling pin housing 212 and allowing the coupling pin to lock into the fixed frame member 104a.

Figure 4:
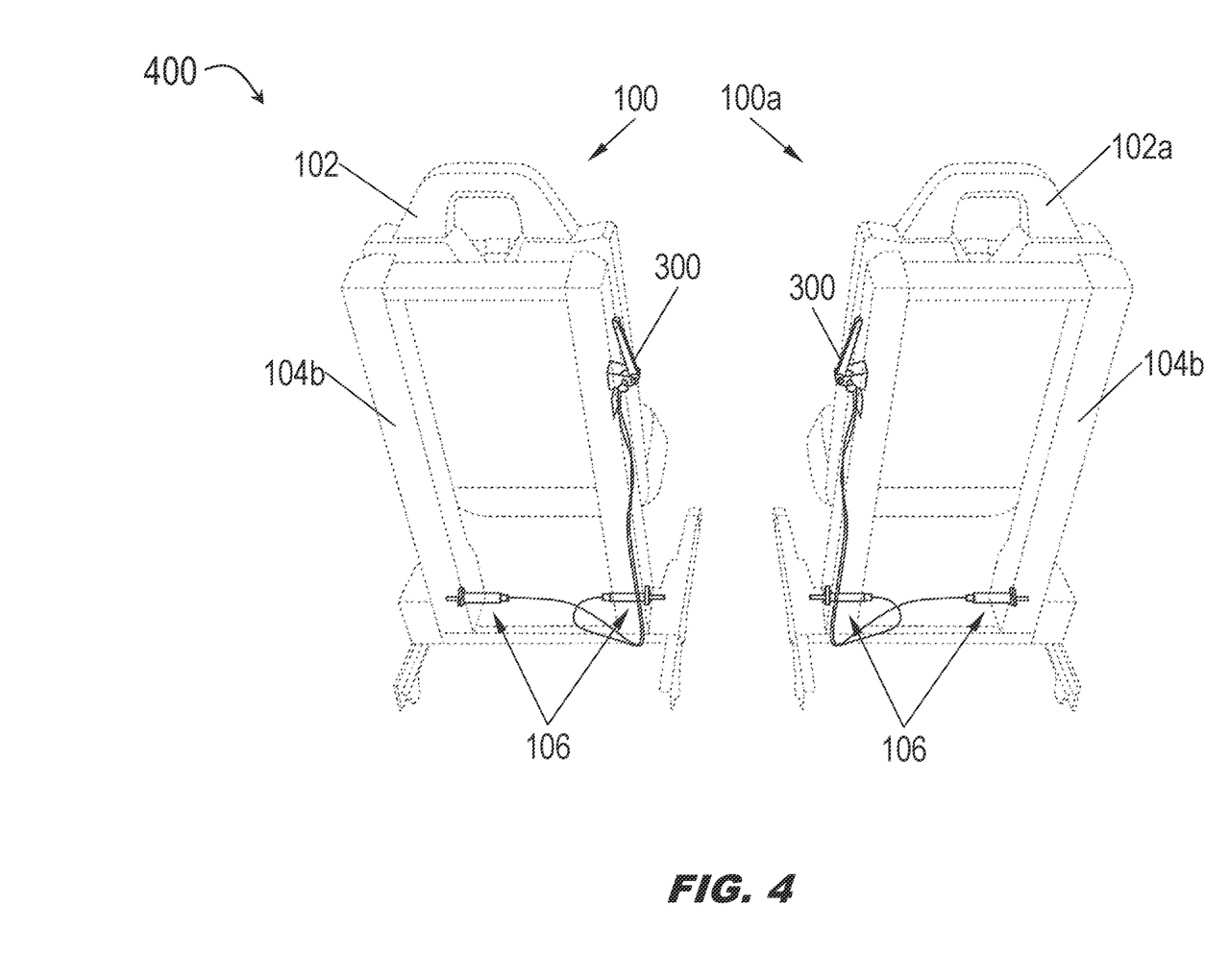
FIG. 4 is a reverse view of the control lever mechanism of FIGS. 3A through 3C.

Referring also to FIG. 4, a cockpit or control area of the rotorcraft 400 is shown. The cockpit may include vehicle seating assemblies 100, 100a comprising operator seats 102, 102a for a pilot (e.g., right-side seat) and co-pilot (e.g., left-side seat) respectively.

in embodiments, the control lever 300 may be attached to each vehicle seating assembly 100, 100a at a location easily accessed by an occupant of the operator seat 102, 102a or by other individuals coming to the aid of an occupant who may be injured or otherwise incapacitated. For example, the control lever 300 may be mounted to a pivoting frame member 104b of each vehicle seating assembly 100, 100a. Further, the control levers 300 (e.g., each connected to coupling pin assemblies 106 on either side of the operator seat 102, 102a) may be mounted to the interior of the cockpit to prevent unintentional engagement, e.g., to the right side of the left-side vehicle seating assembly 100 and to the left side of the right-side vehicle seating assembly 100a.

Figure 5A:
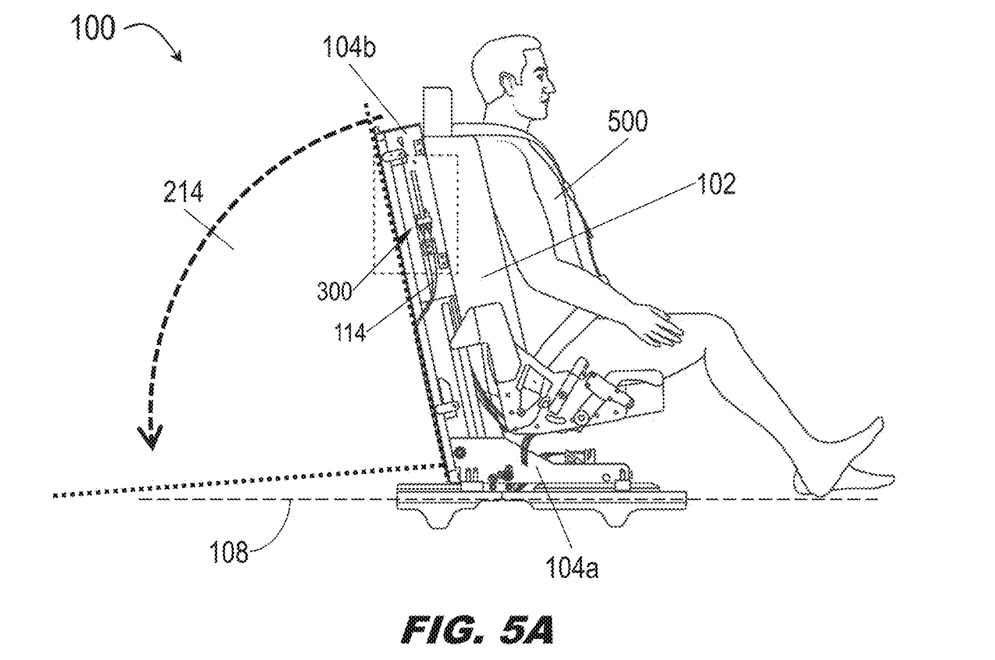
FIGS. 5A and 5B are profile views of the convertible seat frame structure of FIG. 1 in operation.
Figure 5B:
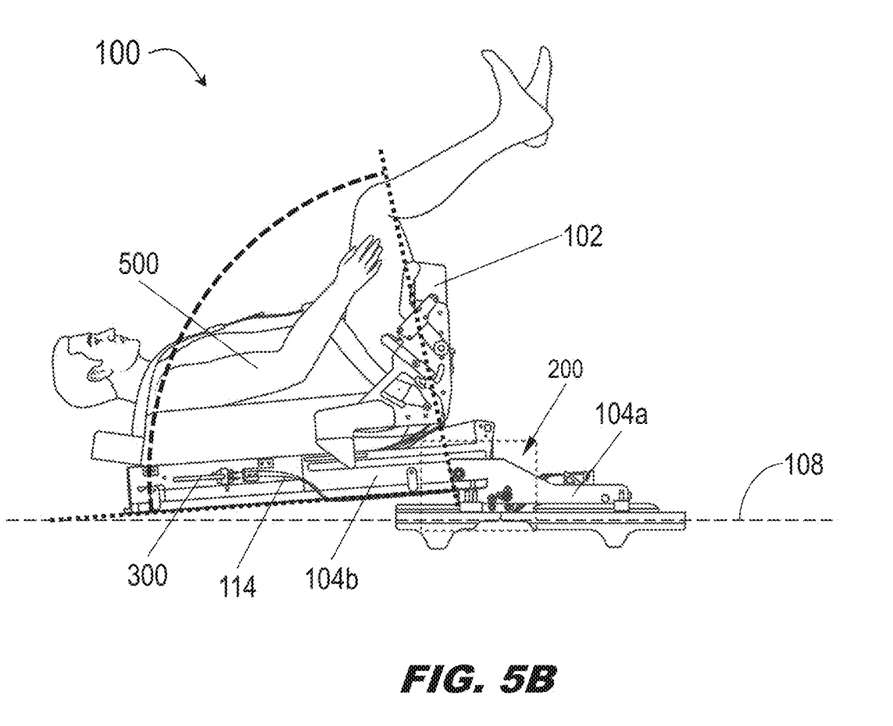

Referring now to FIGS. 5A and 5B, the vehicle seating assembly 100 is shown respectively in a default configuration and an engaged configuration.

In embodiments, when the control lever 300 (FIGS. 3A-3C) is engaged the coupling pin (210, FIG. 2) may be released from the fixed frame members 104a (e.g., via the actuator cables 114), allowing the pivoting frame members 104b (and the operator seat 102 attached thereto, and the occupant 500, if any, of said operator seat) to rotate 214 or tilt rearward relative to the fixed frame members.

Referring in particular to FIG. 5B, in embodiments the pivoting frame members 104b may be capable of rearward rotational movement 214 of at least 80 degrees, e.g., from the upright angle associated with the default configuration of the vehicle seating assembly 100 (e.g., and as shown by FIG. 5A) to a tilted configuration wherein the pivoting frame members contact the cabin floor 108.

Figure 6A:
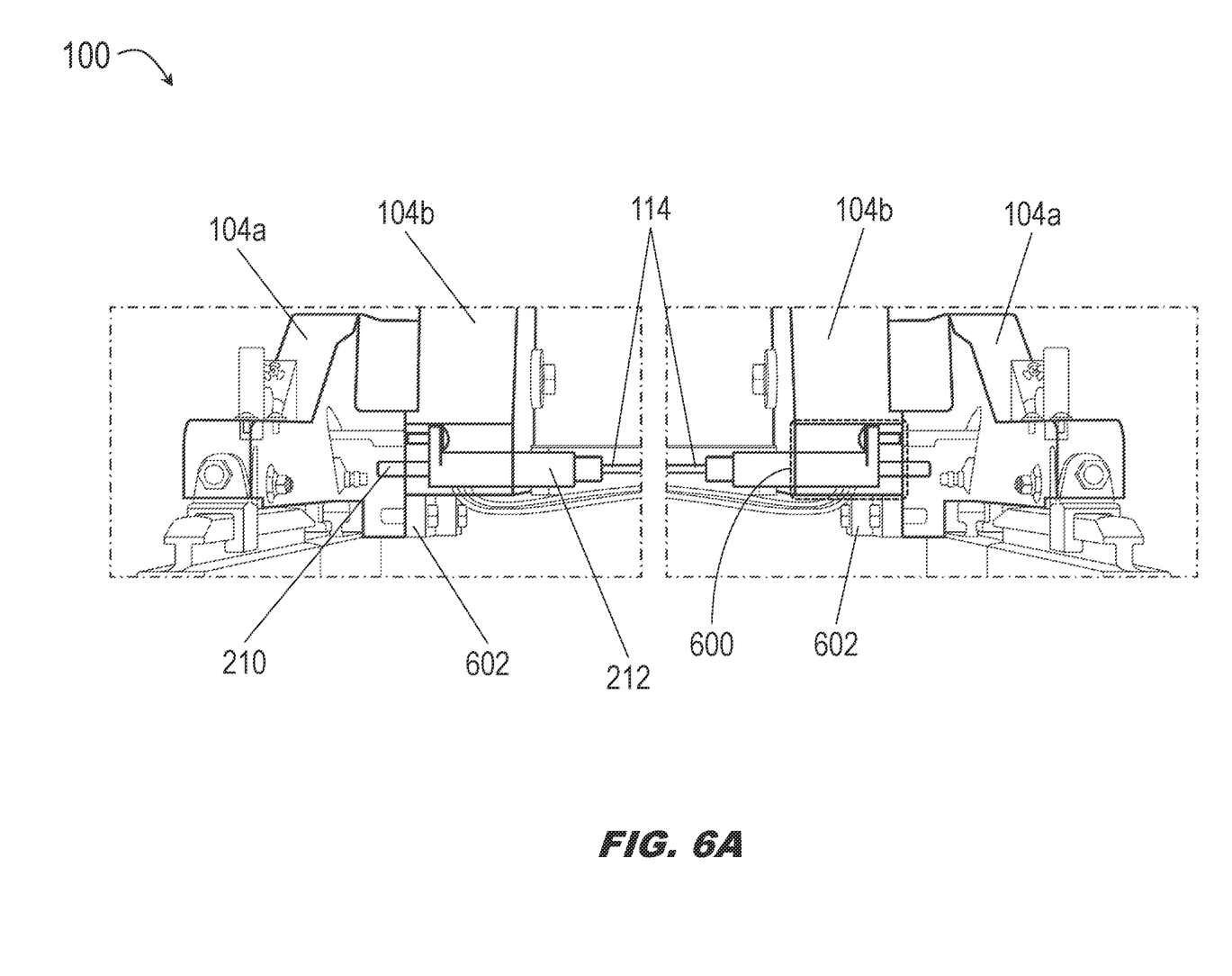
FIGS. 6A and 6B are left-side and right-side detailed views of the convertible seat frame structure of FIG. 1 in respectively a default state and an engaged state.

Referring now to FIG. 6A, the vehicle seating assembly 100 is shown.

In embodiments, when the vehicle seating assembly 100 is in the default configuration as shown by FIG. 6A (and as also shown by FIG. 5A), the coupling pins 210 (each coupling pin set into a coupling pin housing 212) may extend into the fixed frame members 104a, securing the pivoting frame members 104b thereto. For example, a coupling interface 600 set into the pivoting frame members 104b may accept the coupling pin housing 212, such that the coupling pin housings and coupling pins 210 extend fully through the pivoting frame members and partially into the fixed frame members 104a, where the coupling pins may fit into a recess or hole within the fixed frame members.

Figure 6B:
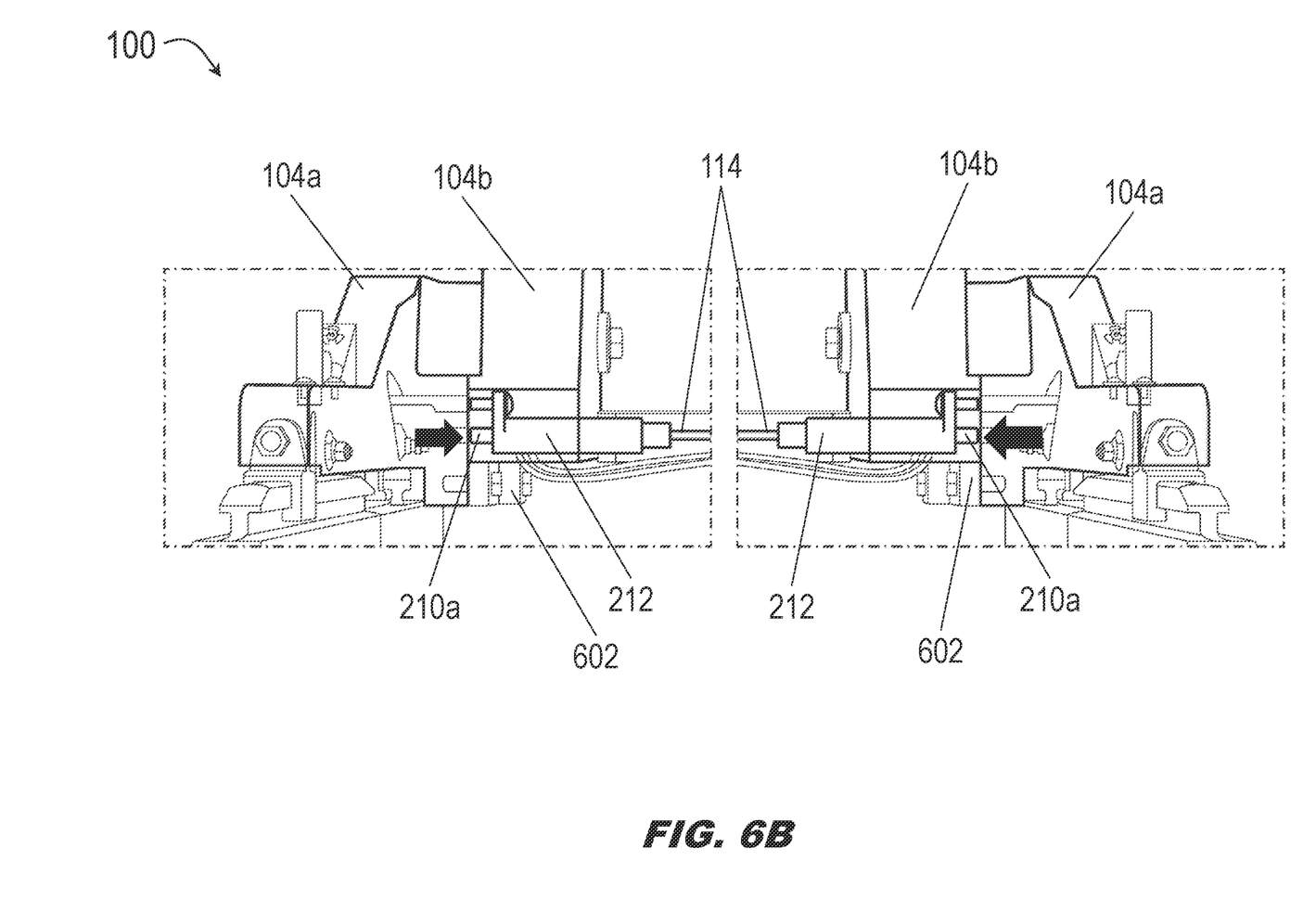

Referring also to FIG. 6B, in embodiments the coupling pins may be retracted (210a) partially into their respective coupling pin housings 212, and retracted fully from within the fixed frame members 104a, when the control lever (300, FIGS. 3A-3C) is engaged and the vehicle seating assembly 100 is transitioned into the engaged configuration. For example, the rotated control lever (300, FIG. 3C) may engage the actuator cables 114, retracting the coupling pins (210a) into their respective coupling pin housings 212 and disengaging the pivoting frame members 104b from the fixed frame members 104a, allowing the pivoting frame members to be rotated (214, FIGS. 5A-5B) or tilted rearwards as shown by FIG. 5B.

In embodiments, the coupling pin assembly (106, FIG. 1), e.g., the coupling pins 210 and coupling pin housings 212, may be protected from forward rotational loads by a ledger 602 or stabilizing shelf bolted or otherwise attached to the fixed frame members 104a directly underneath the coupling pin and coupling pin housing. For example, in the event that the pivoting frame members 104b are subject to significant forward loading (e.g., associated with an impact event and/or energy attenuation on the part of the vehicle seating assembly 100), the ledgers 602 may allow the transfer of forward rotational loads from the pivoting frame members 104b to the fixed frame members 104a without damaging the coupling pins 210 or coupling pin housings 212.

Figure 7:
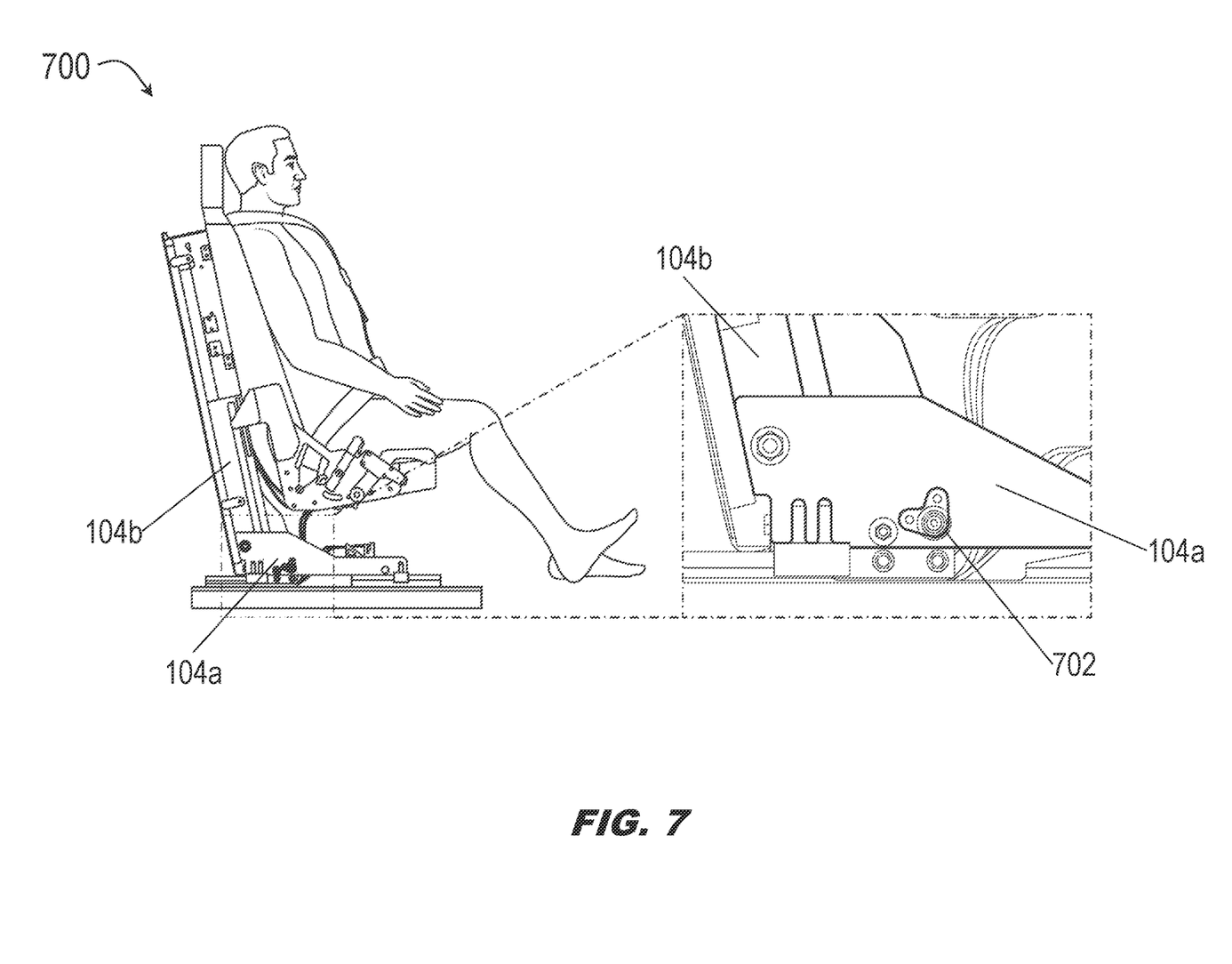
FIG. 7 is a detailed view of the convertible seat frame structure of FIG. 1 converted to lock out breakover capability.

Referring now to FIG. 7, the vehicle seating assembly 700 may be implemented similarly and may function similarly to the vehicle seating assemblies 100, 100a of FIGS. 1 through 6B, except that the vehicle seating assembly 700 may be converted into a non-breakover configuration.

In embodiments, the vehicle seating assembly 700 may be converted into a non-breakover configuration wherein the pivoting frame members 104b remain at a fixed angle relative to the fixed frame members 104a and may not be rotated (214, FIG. 2) relative to the fixed frame members. For example, the control lever (300, FIGS. 3A-3C), actuator cables (114, FIGS. 6A-6B) and coupling pin assembly (106, FIG. 1) may be removed from the vehicle seating assembly 100, 100a and a fixed coupling pin 702 inserted into the coupling interface (600, FIGS. 6A-6B).

Figure 8A:
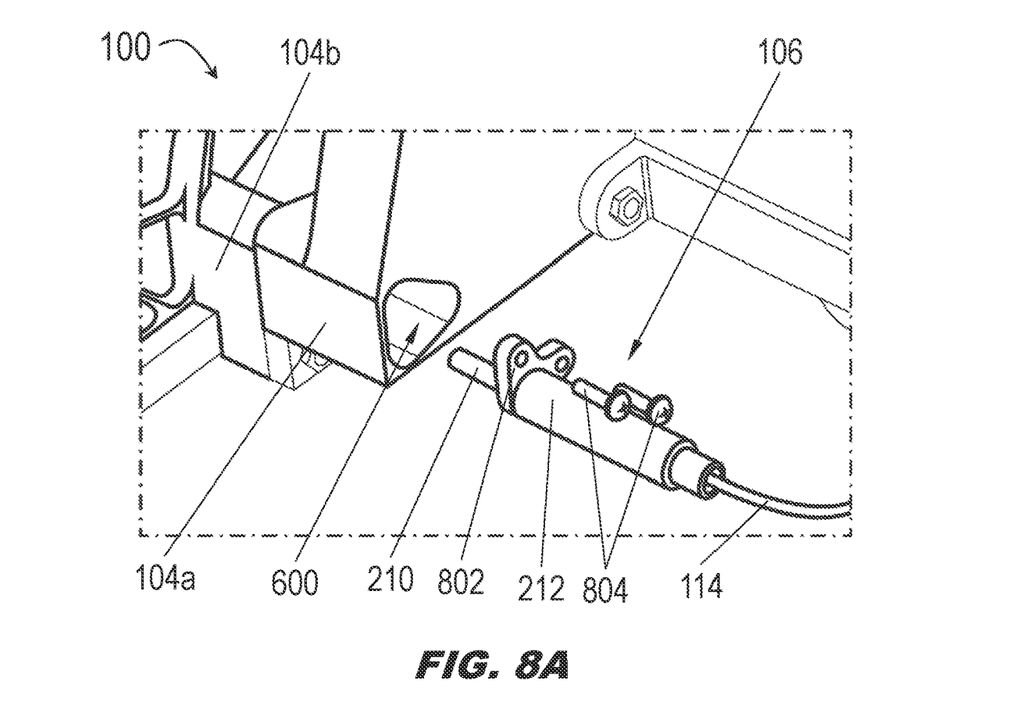
FIGS. 8A and 8B are detailed views of the convertible seat frame structure of FIG. 1 showing conversion between breakover and non-breakover capability.
Figure 8B:
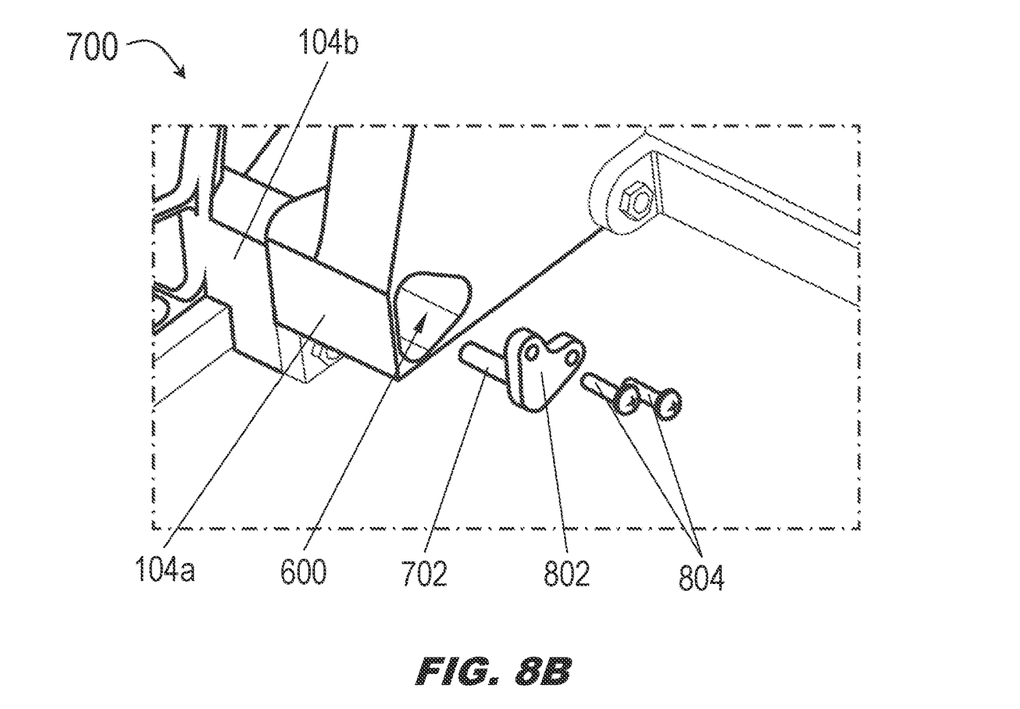

Referring now to FIGS. 8A and 8B, the vehicle seating assemblies 100, 700 are respectively shown.

In embodiments, referring in particular to FIG. 8A, the coupling interface 600 may be set into each pivoting frame member 104b. For example, the coupling interface 600 may be a hole or recess extending fully through the pivoting frame member 104b and capable of accepting the coupling pin assembly 106. The coupling interface 600 may be sized and shaped to accommodate the coupling pin housing 212, and may allow the coupling pin 210 to extend into a recess or hole set into the fixed frame member 104a (as shown by FIG. 6A), securing the pivoting frame members 104b to the fixed frame members and the vehicle seating assembly 100 in its default configuration.

Referring now to FIG. 8B, the vehicle seating assembly 100 of FIG. 8A may be converted to the non-breakover vehicle seating assembly 700 of FIG. 8B by removing the coupling pin assembly 106 from the coupling interface 600 (e.g., along with the control lever (300, FIGS. 3A-3C) and actuator cables 114) and inserting the fixed coupling pin 702 into the coupling interface. In embodiments, the fixed coupling pin 702 may be identical in size, shape, and material to the coupling pin 210. Further, the coupling pin assembly 106 and fixed coupling pin 702 may share flanged mounting ears 802 and mounting screws 804 (e.g., or other like mounting components and mounting fasteners), which may likewise be identical in size, shape, and material.

In embodiments, the vehicle seating assembly 100 (e.g., capable of breakover and non-breakover modes) may be converted to the vehicle assembly 700 (e.g., capable of non-breakover mode only), and vice versa. For example, the tilt controller (e.g., coupling pin housing 212, coupling pin 210, cables 114, optionally control lever 300) may be removed from the vehicle seating assembly 100 and replaced with the fixed coupling pin 702. As noted above, the fixed coupling pin 702 may be attached to the fixed frame member 104a via flanged mounting ears 802 (e.g., compatible with the coupling interface 600) and mounting screws 804. Further, the vehicle seating assemblies 100, 700 may not require separate strength testing for transitioning between default and breakover configurations, as the coupling interfaces linking the fixed frame members 104a and pivoting frame members 104b share identical components, e.g., the coupling pins 210/702, flanged mounting ears 802, and mounting screws 804.

Figure 9:
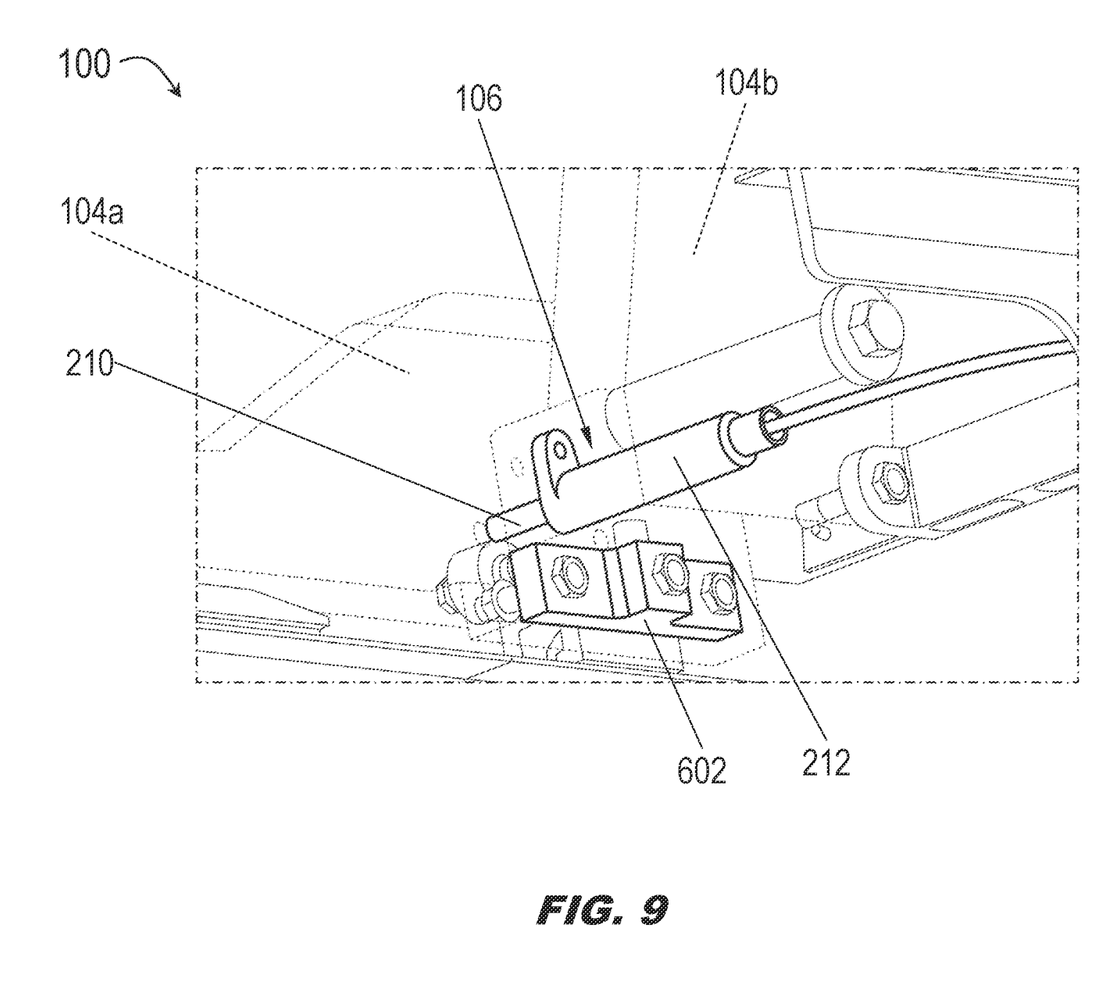
FIG. 9 is a detailed view of a stabilizing shelf for the convertible seat frame structure of FIG. 1.

Referring to FIG. 9, the vehicle seating assembly 100 is shown.

In embodiments, the ledger 602 may be bolted or otherwise attached to the fixed frame member 104a directly under the coupling pin assembly 106. For example, the ledger 602 may be disposed directly under a portion of the pivoting frame member 104b through which the coupling pin assembly 106 passes (e.g., via the coupling interface 600, FIGS. 8A and 8B). As noted above, the ledger 602 may provide for the transfer of forward rotational loads from the pivoting frame members 104b to the fixed frame members 104a without otherwise damaging the coupling pin housing 212 or the coupling pin 210.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A convertible seat frame structure for a vehicle operator seat, comprising:
   at least one fixed frame member attachable to a cabin floor of a vehicle;
   at least one pivoting frame member capable of supporting a seat for a vehicle operator, the at least one pivoting frame member attached to the at least one fixed frame member via a bushing assembly;
   the seat frame structure having a default mode and a breakover mode, the at least one pivoting frame member configured for rearward rotational movement of at least 80 degrees relative to the at least one fixed frame member and relative to a rotational axis defined by the bushing assembly when in the breakover mode;

a tilt controller comprising at least one coupling pin capable of extending through the at least one pivoting frame member and at least partially into the at least one fixed frame member;

and a control lever attached to the seat frame structure and operatively coupled to the tilt controller via at least one cable, the control lever configured for transitioning the seat frame structure from the default mode to the breakover mode by retracting the at least one coupling pin into the at least one pivoting frame member.

2. The convertible seat frame structure of claim 1, further comprising:

a locking pin configured for securing the control lever in a locked position, the control lever articulable to transition the seat frame structure from the default mode to the breakover mode upon removal of the locking pin from an articulation path of the control lever.

3. The convertible seat frame structure of claim 1, wherein the control lever is configured for returning the seat frame structure to the default mode by returning the control lever to its locked position.

4. The convertible seat frame structure of claim 1, wherein the at least one coupling pin is set into a housing, further comprising:

at least one ledger attached to the at least one fixed frame member between the housing and the cabin floor, the at least one ledger capable of transferring a forward rotational load associated with the at least one pivoting frame member to the at least one fixed frame member; and wherein the control lever is configured for returning the seat frame structure to the default mode by returning the control lever to its locked position.

5. The convertible seat frame structure of claim 1, wherein:

the coupling pin is a spring-loaded coupling pin set into a coupling pin housing, the coupling pin housing one or more compression springs associated with an extension and retraction of the coupling pin and controlled via the control lever and the at least one cable;

and wherein each coupling pin housing further comprises:

a flanged mounting component configured to fit a coupling interface extending into the fixed frame member, the flanged mounting component secured to the fixed frame member by one or more mounting fasteners.

6. The convertible seat frame structure of claim 5, wherein:

the tilt controller is configured for removal from the seat frame structure and replacement by a fixed coupling capable of fixing the seat frame structure in the default configuration, the fixed coupling consisting of:

the coupling pin;

the flanged mounting component attached to the coupling pin;

and the one or more mounting fasteners securing the flanged mounting component to the fixed frame member.

7. A convertible vehicle operator seat assembly, comprising:

an operator seat configured to accommodate an operator of a vehicle;

a seat frame structure comprising:

at least one fixed frame member attachable to a cabin floor of the vehicle;

at least one pivoting frame member capable of supporting the operator seat, the at least one pivoting frame member attached to the at least one fixed frame member via a bushing assembly;

the seat frame structure having a default mode and a breakover mode, the at least one pivoting frame member secured at a fixed angle to the at least one pivoting frame member when in the default mode, the at least one pivoting frame member configured for rearward rotational movement of at least 80 degrees relative to the at least one fixed frame member and relative to a rotational axis defined by the bushing assembly when in the breakover mode;

a tilt controller comprising at least one coupling pin capable of extending through the at least one pivoting frame member and at least partially into the at least one fixed frame member;

and a control lever attached to the seat frame structure and articulable by the vehicle operator, the control lever operatively coupled to the tilt controller via at least one cable, the control lever configured for transitioning the seat frame structure from the default mode to the breakover mode by retracting the at least one coupling pin into the at least one pivoting frame member.

8. The convertible vehicle operator seat of claim 7, further comprising:

a locking pin configured for securing the control lever in a locked position, the control lever articulable to transition the seat frame structure from the default mode to the breakover mode upon removal of the locking pin from an articulation path of the control lever.

9. The convertible vehicle operator seat of claim 7, wherein the control lever is configured for returning the seat frame structure to the default mode by returning the control lever to its locked position.

10. The convertible vehicle operator seat of claim 7, wherein the at least one coupling pin is set into a housing, further comprising:

at least one ledger attached to the at least one fixed frame member between the housing and the cabin floor, the at least one ledger capable of transferring a forward rotational load associated with the at least one pivoting frame member to the at least one fixed frame member; and wherein the control lever is configured for returning the seat frame structure to the default mode by returning the control lever to its locked position.

11. The convertible vehicle operator seat of claim 7, wherein:

the coupling pin is a spring-loaded coupling pin set into a coupling pin housing, the coupling pin housing one or more compression springs associated with an extension and retraction of the coupling pin and controlled via the control lever and the at least one cable;

and wherein each coupling pin housing further comprises:

a flanged mounting component configured to fit a coupling interface extending into the fixed frame member, the flanged mounting component secured to the fixed frame member by one or more mounting fasteners.

12. The convertible vehicle operator seat of claim 11, wherein:
the tilt controller is configured for removal from the seat frame structure and replacement by a fixed coupling capable of fixing the seat frame structure in the default configuration, the fixed coupling consisting of:
the coupling pin;
the flanged mounting component attached to the coupling pin;
and
the one or more mounting fasteners securing the flanged mounting component to the fixed frame member.

* * * * *